Patented Apr. 27, 1926.

1,582,227

UNITED STATES PATENT OFFICE.

LELAND L. REBBER, OF LOS ANGELES, CALIFORNIA, ASSIGNOR TO UNION OIL COMPANY OF CALIFORNIA, OF LOS ANGELES, CALIFORNIA, A CORPORATION OF CALIFORNIA.

PREPARING CASTOR MACHINE OILS.

No Drawing.   Application filed May 9, 1922.   Serial No. 559,613.

*To all whom it may concern:*

Be it known that I, LELAND L. REBBER, a citizen of the United States, and resident of Los Angeles, in the county of Los Angeles and State of California, have invented certain new and useful Improvements in Preparing Castor Machine Oils, of which the following is a specification.

My invention relates to improvements in preparing a lubricant known as castor machine oil, using mainly by-products obtained from the refining of crude petroleum, and excluding therefrom entirely all oils of vegetable or animal origin, and my product is designated as mineral castor machine oil, containing as its bases solely by-products from oil of mineral origin as opposed to castor machine oil which may contain as its bases oils in any combination of vegetable and/or animal and/or mineral origin made by any other known process.

The salient feature of my invention is the use of the naphthenic acids obtained from waste alkali washes produced in the purification of petroleum distillates, such naphthenic acids being heretofore of little use, same as fuel oil.

Naphthenic acids are organic acids composed of a hydrocarbon radical, or a substitute of hydrocarbon radical of the naphthene series $C_nH_{2n}$ in combination with a carboxyl group of which hexahydrobenzoic acid, $C_6H_{11}COOH$, may be taken as illustrative.

They are insoluble in water, soluble in ether, and distil with steam without decomposition.

These nahpthenic acids remain in solution in distillates, in particular lubricating oil distillates, after treatment with sulphuric acid and upon the addition of alkali, preferably a solution of sodium or potassium hydroxide; some conversion to sodium or potassium naphthenates takes place, these being contained in the waste alkali solution or alkali sludge which is removed from the oil distillate in any suitable manner.

Inasmuch as I preferably use sodium hydroxide as the neutralizing alkaline solution I will base the steps of my process on the recovery and use of sodium naphthenates, although I do not limit myself hereby to the use of this material but may use any equivalent giving the desired result.

The waste liquor from the treatment of lubricating oil distillate with alkali contains naphthenic acids, together with sodium naphthenates formed by the action of the alkali on the naphthenic acids, and to completely separate them from the alkali sludge, I treat the sludge with a solution of sodium chloride or brine, which may be in the form of sea water, when the alkaline solution is dilute, or with solid salt when the alkaline solution is concentrated.

The use of a brine or solid salt is preferred inasmuch as, while a partly saponified mixture of nahpthenic acids and alkali metal naphthenates may be precipitated from an alkaline sludge by other agents, as sulphuric acids, carbon dioxide, etc., such agents are comparatively expensive for my process.

By using a cheap precipitant, such as common salt, I carry over the impurities along with the mixture of naphthenic acids and naphthenates, but they are removed from the same after conversion, as will be later described.

After separation, saponification is completed by treating with a strong sodium hydroxide solution, and the resulting sodium naphthenic soaps are converted into aluminum naphthenic soaps by mixing and boiling with an excess of a solution of aluminum sulphate or other soluble aluminum salts, such as those of mineral acids, for example aluminum chloride or double aluminum salts such as the alums, the waste liquor is drawn off and the product washed repeatedly with boiling water in which the impurities are generally soluble, but those which are not soluble, such as sand, etc., are mechanically removed from the aluminum soaps.

The aluminum naphthenic soaps as above recovered are characterized by high viscosity, and appear as a rubbery mass, insoluble in water but soluble in lubricating oils, as well as in other like oils such as kerosene, etc., and are generally of a yellowish color.

The aluminum naphthenic soaps are best washed by grinding or cutting into small pieces in the presence of fresh water, then drained and mixed with the oil with which they are desired to be compounded, and then dehydrated, such compounding oil being any of a number of different stocks, preferably lubricating oils.

The resulting product is a clear, stable mineral castor machine oil, so called because it overcomes the inherent defects of the castor machine oil made from bases of vegetable or animal origin and for which it is intended as a substitute in all its grades.

All commercial castor machine oils made from bases of vegetable or animal origin are unstable, breaking down and becoming thin at normal temperatures in time, and breaking down much faster at higher temperatures, thereby becoming useless for the purpose for which they are intended, one of the uses for such in general being as a lubricating oil for bearings in places where the heat engendered by friction is low whereby the oil maintains its viscosity, and in such places as open ended bearings where the tenacity of the oil causes a minimum waste through leakage.

On the contrary my mineral castor machine oil is unaffected by such normal changes as cause castor machine oil to disintegrate, retaining its viscosity within the heat limits for which it is intended.

It is not emulsifiable with water and clings to a wet as well as to a dry surface. It may be made having varying degrees of viscosity, depending upon the stock with which it is compounded, but principally upon the amount of napthenates contained therein, and since the soap base thereof is made from practically waste material its cost is materially reduced below that of other oils used for the same general purpose.

From the foregoing description, it is clear that not only can the naphthenic acids forming the base of the aluminum soaps be extracted from a petroleum distillate such as a lubricating oil by an alkali treatment, but also the same lubricating oil can be further used to dissolve the aluminum naphthenic soap thereby forming a castor machine oil from bases of purely mineral origin.

In this manner, it will be seen that my mineral castor machine oil may be prepared from bases obtained from the one batch of crude petroleum when being refined, which bases are considered to be the naphthenic acids and a distillate, preferably a lubricating oil.

I claim:

1. The process of preparing a mineral castor machine oil which comprises saponifying naphthenic acids, to produce a compound insoluble in water, then dissolving the naphthenic soaps in a mineral oil.

2. The process of preparing a mineral castor machine oil which comprises saponifying naphthenic acids with an alkali metal hydroxide, converting the alkali metal naphthenic soaps into aluminum naphthenic soaps by mixing therewith a soluble aluminum salt, then dissolving the aluminum naphthenic soaps in a mineral oil.

3. The process of preparing a mineral castor machine oil which comprises saponifying naphthenic acids with sodium hydroxide, converting the sodium naphthenic soaps into aluminum naphthenic soaps by treating with a soluble aluminum salt of a mineral acid, then dissolving the aluminum naphthenic soaps in a mineral oil.

4. The process of preparing a mineral castor machine oil which comprises saponifying naphthenic acids with an alkali metal hydroxide, converting the naphthenic soaps into aluminum naphthenic soaps by treating with an aluminum salt of a mineral acid, washing and dehydrating the aluminum soaps and mixing therewith a mineral oil.

5. The process of preparing a mineral castor machine oil which comprises saponifying naphthenic acids with sodium hydroxide, converting the sodium naphthenic soaps into aluminum naphthenic soaps by boiling with aluminum sulphate, washing and dehydrating the aluminum naphthenic soaps, then dissolving the washed and dehydrated aluminum soaps in a lubricating oil.

6. The process of preparing a castor machine oil solely from bases derived from a mineral oil which comprises saponifying naphthenic acids, which remain in petroleum distillates after treatment with sulphuric acid, with sodium hydroxide, converting the resulting sodium naphthenic soaps into aluminum naphthenic soaps by treating with aluminum sulphate, washing and dehydrating the aluminum naphthenic soaps, then dissolving the washed and dehydrated aluminum soaps in a lubricating oil.

7. A castor machine oil comprising aluminum naphthenic soap dissolved in a heavier petroleum distillate.

8. A castor machine oil consisting of an aluminum naphthenic soap dissolved in a lubricating oil.

9. A castor machine oil consisting of a washed and dehydrated aluminum naphthenic soap dissolved in a lubricating oil.

10. A castor machine oil consisting of an aluminum soap, derived from the naphthenic acids in crude petroleum, dissolved in a lubricating oil; the aluminum soap being characterized by its high viscosity, rubber-like properties, and insolubility in water.

11. A castor machine oil made solely from bases of mineral origin comprising a mixture of an aluminum naphthenic soap and a lubricating oil; both the naphthenic acids from which the aluminum soap is made and the lubricating oil being derived from the same crude petroleum.

12. The process of preparing a mineral castor machine oil which comprises saponifying naphthenic acids with sodium hydroxide and thereby forming a compound insoluble in water, converting the sodium naphthenic soaps by treating with aluminum sulphate, and then dissolving the aluminum naphthenic soap in mineral oil.

Signed at Los Angeles, in the county of Los Angeles and State of California, this 27th day of March A. D. 1922.

LELAND L. REBBER.